Jan. 6, 1942.  M. N. BONSIAKOS  2,269,003
PNEUMATIC TIRE TUBE
Filed Oct. 11, 1940  2 Sheets-Sheet 1

INVENTOR.
MICHAEL N. BONSIAKOS
BY

Jan. 6, 1942.   M. N. BONSIAKOS   2,269,003
PNEUMATIC TIRE TUBE
Filed Oct. 11, 1940   2 Sheets-Sheet 2

INVENTOR.
MICHAEL N. BONSIAKOS
BY

Patented Jan. 6, 1942

2,269,003

UNITED STATES PATENT OFFICE 2,269,003

PNEUMATIC TIRE TUBE

Michael N. Bonsiakos, San Francisco, Calif.

Application October 11, 1940, Serial No. 360,766

2 Claims. (Cl. 152—331)

This invention relates to improvements in pneumatic tubes commonly employed in automobile tires, airplane tires, and the tires of like vehicles.

The principal object of this invention is to provide a tire tube wherein a plurality of cells are so arranged that it is impossible to completely deflate the tire either from a puncture or a blowout occurring in a portion of the tire.

A further object of the invention is to produce a tube which may be employed with any standard casing without altering the construction of the casing.

A further object of the invention is to provide means whereby certain sections of the tire will remain at all times inflated while other sections of the tire may be deflated for the purpose of installing and removing from the casing and rim.

A further object is to provide a sliding valve arrangement which will automatically shut off the escape of air from the major portion of the tube.

Other objects and advantages will be apparent during the course of the following description.

In the accompanying drawings forming a part of this specification and in which like numerals are employed to designate like parts throughout the same, Fig. 1 is a vertical cross sectional view of the entire tube;

The ordinary tube employed with a tire casing is merely a hollow rubber endless chamber within which compressed air may be placed to create an outward pressure on the interior of the tire casing, thus holding the casing to the rim and inflated for easy riding. This type of tube is exceedingly dangerous, particularly with the modern drop center rims, for the reason that as soon as a puncture occurs or a blowout takes place, air is released from the tube and the shoe or casing drops into the rim, causing the car to skid and often turn over with serious results.

Applicant has, therefore, produced a tube which may be readily built up in sections so as to form a completely circular doughnut-like structure which may be readily inserted in the shoe and inflated. This doughnut-like structure is divided into two concentric chambers, the outer one of which is in turn divided into a plurality of channel-like chambers, which chambers are subdivided by horizontal partitions so as to form cell-like chambers. By permanently inflating certain of these chambers and temporarily inflating other of these chambers, I have provided a tube wherein a puncture may occur in one of the chambers without permitting escape of air from the other of the chambers, or a blowout may occur in one of the chambers without releasing air from the other of the chambers, or by deflating the temporarily inflated portion the tube may be reduced in size sufficient to remove the same from the casing or rim.

In the accompanying drawings wherein for the purpose of illustration is shown a preferred embodiment of my invention, the letters A, B, C, and D refer to four tubular sections which, when secured together in end to end relation and vulcanized or otherwise joined as by bands 5, form the doughnut-like structure resembling an automobile tire tube. As each of these sections are identical in construction, but one will be described.

Figure 2:
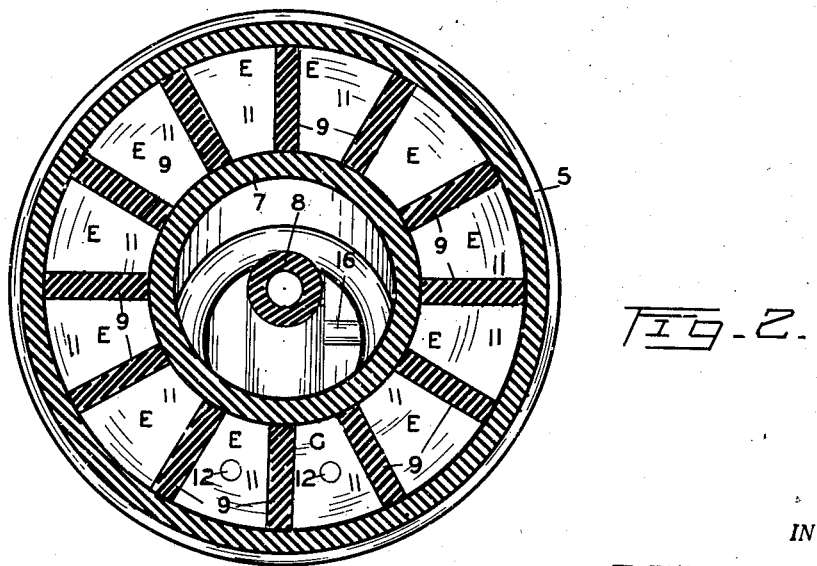
Fig. 2 is an enlarged cross sectional view taken on the line 2—2 of Fig. 1, the tread portion of the tube being toward the top of the drawings.
Figure 3:
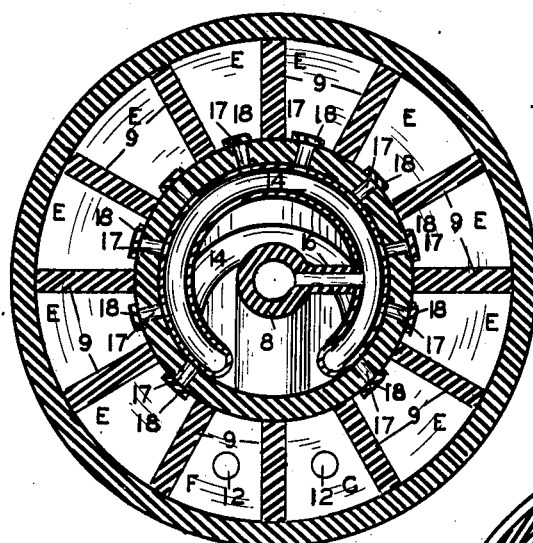
Fig. 3 is a similar view taken on the line 3—3 of Fig. 1, the tread portion being toward the top of the drawings.

The numeral 6 refers to the outer tube and the numeral 7 the inner tube, which tubes are concentrically arranged. Within the inner tube 7 is a air hose 8. By referring to Fig. 2 it will be noted that the space between the inner tube and the outer tube is divided by providing longitudinal partitions 9. It is, of course, understood that these partitions are cemented or otherwise fastened to the two tubes. By referring to Fig. 1 it will be noted that cross partitions 11 divide these longitudinal chambers into cells, designated by the letter E. By again viewing Fig. 1 it will be noted that in the tube sections nearest the rim I have eliminated several of the partitions 11 so as to create parallel elongated cells F and G. These cells are interconnected by ports 12 and 13. In order to introduce air into the cells E, I provide a plurality of rubber conduits 14, which are in turn connected to the air hose 8, as shown at 16 (see Fig. 3). Ports 17 connect each of the cells E with the conduits 14, and these ports are closed by rubber valves 18, which prevent any air escaping from the cell after the same has been introduced thereinto.

Figure 6:
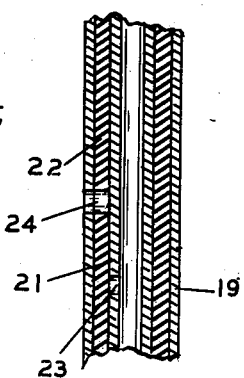
Fig. 6 is an enlarged fragmentary sectional view, showing a portion of the inflation valve with the tube ports out of registration.
Figure 4:
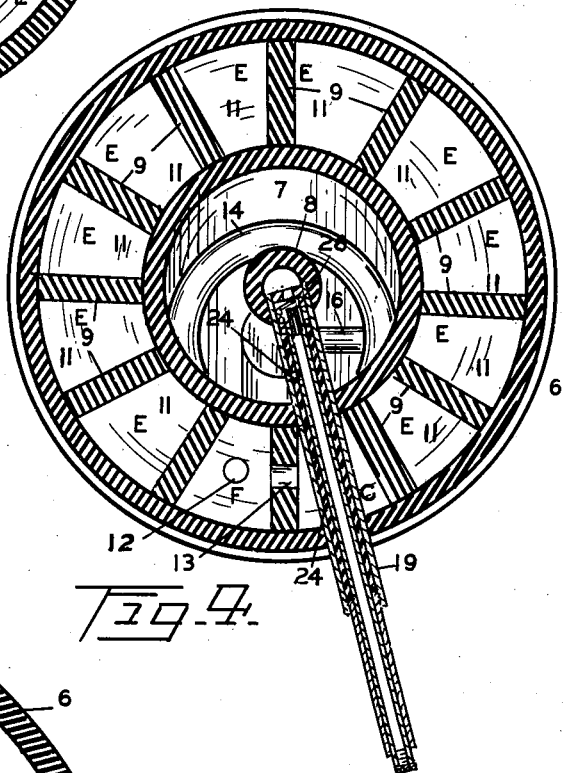
Fig. 4 is a cross sectional view taken on the line 4—4 of Fig. 1, the tread portion being toward the top of the drawings.
Figure 5:
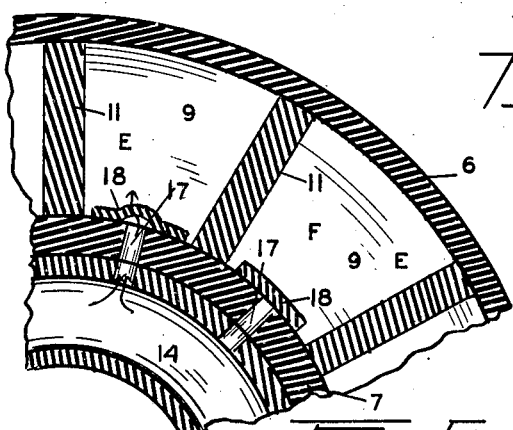
Fig. 5 is an enlarged fragmentary detailed view, showing one of the inflation cell valves.

Referring now to Figs. 4 and 6, it will be noted that the inflating tube 19 extends from a point outside the outer tube 6 to a point within the air hose 8. Within this inflating tube 19 is a sliding valve 21. A packing 22 is interposed therebetween. This sliding valve has ports 23, which are adapted to align with ports 24. A spring 26 normally keeps these ports out of registration. It is, of course, understood that there is a pair of ports for each of the two sections of the tire.

Figure 1:
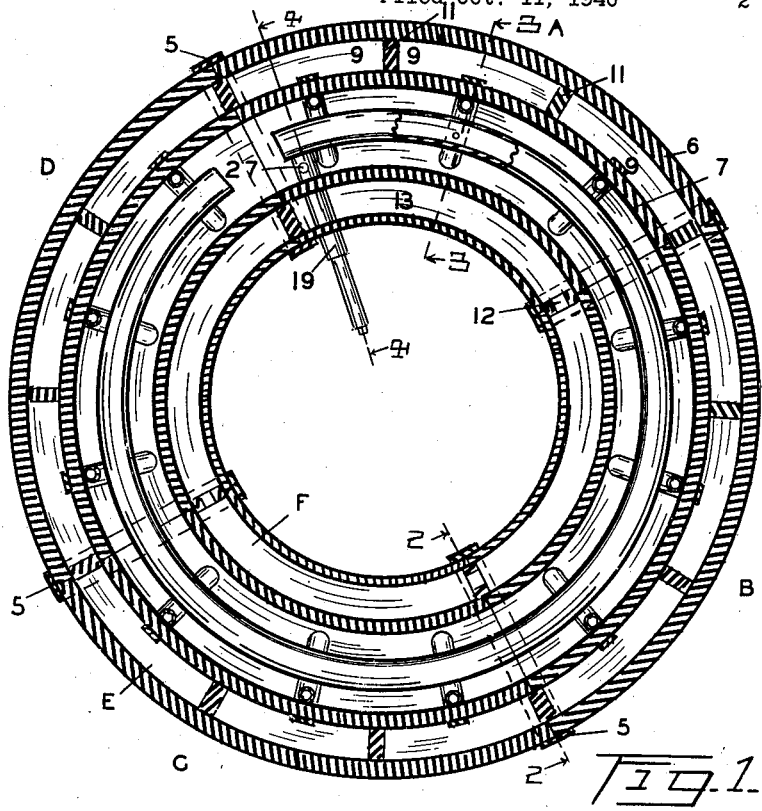

The result of this construction is that when a tire is constructed, as shown in Fig. 1, and the same is placed within a casing and mounted upon a rim, the user first removes the cap from the sliding valve and applies an air hose thereto, which act will compress the spring 26 and permit air to flow through the ports 23 and 24 into the inner tube 7 and into the space between the inner tube 7 and the outer tube 6 occupied by the cells F and G. At the same time, air will enter the air hose 8, from which it will flow into the conduits 14 and through the ports 17 into the cells E. Thus the entire tire will be inflated.

Should it be desired to deflate the tire, the sliding valve will be depressed, bringing the ports 23 and 24 into registration, with the result that all the air will be exhausted from the inner tube 7 and the cell sections F and G. However, due to the fact that the valves 18 are held closed by the air pressure in the cells E, no air will escape therefrom; but the air which has escaped will be sufficient to permit removal of the tube from the rim and the casing.

Should the tire be in use and a puncture occur in one of the cells E, only the air from that cell will escape, or if a blowout occurs, only the air from the particular cell affected will escape.

It will thus be seen that I have produced a tire tube which has all the advantages herein set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A multiple cell tire tube comprising an inner tube arranged concentrically to an outer tube, an air hose substantially concentrically mounted in said inner tube, the space between said inner tube and said outer tube being divided into cells, conduits connecting certain of said cells and said air hose, means for conducting air to said cells and to said inner tube from a point outside said outer tube, said means including an inflating tube communicating with said air hose and having ports therein communicating with said inner tube and certain of said cells formed between said inner tube and said outer tube adjacent the inner periphery of said outer tube, and a sliding valve mounted in said inflating tube and having ports movable into registration with said first-mentioned ports.

2. A multiple cell tire tube comprising a pair of concentrically arranged tubes, longitudinal partitions interposed between said tubes, horizontal partitions extending between said longitudinal partitions and forming air retaining cells, an air hose substantially concentrically positioned in the inner of said concentrically arranged tubes and communicating with certain of said cells, the remaining cells adjacent the inner periphery of the outer of said concentrically arranged tubes communicating one with the other, valve means to prevent retrograde movement of air delivered to said first mentioned cells, means for introducing air into and removing air from said interconnecting cells, said means including an inflating tube communicating with said air hose and having ports communicating with said inner tube and certain of said cells formed between said inner and said outer tubes adjacent the inner periphery of the outer of said concentrically arranged tubes, and a sliding valve mounted in said inflating tube and having ports movable into registration with said first-mentioned ports.

MICHAEL N. BONSIAKOS.